(12) United States Patent
Zhang et al.

(10) Patent No.: US 10,329,445 B2
(45) Date of Patent: Jun. 25, 2019

(54) METHOD FOR PREPARING NANO-SILVER POWDER AND APPLICATION IN PREPARATION OF ELECTRICALLY CONDUCTIVE INK OF THE NANO-SILVER POWDER AND ELECTRICALLY CONDUCTIVE INK

(71) Applicant: Institute of Chemistry, Chinese Academy of Sciences, Beijing (CN)

(72) Inventors: Xingye Zhang, Beijing (CN); Yanlin Song, Beijing (CN)

(73) Assignee: Institute Of Chemistry, Chinese Academy of Sciences, Beijing (CN)

( * ) Notice: Subject to any disclaimer, the term of this patent is extended or adjusted under 35 U.S.C. 154(b) by 277 days.

(21) Appl. No.: 14/956,596

(22) Filed: Dec. 2, 2015

(65) Prior Publication Data
US 2016/0152851 A1 Jun. 2, 2016

(30) Foreign Application Priority Data
Dec. 2, 2014 (CN) .......................... 2014 1 0723078

(51) Int. Cl.
*C09D 11/52* (2014.01)
*B22F 9/24* (2006.01)
(Continued)

(52) U.S. Cl.
CPC ............ *C09D 11/52* (2013.01); *B22F 1/0018* (2013.01); *B22F 1/0022* (2013.01); *B22F 1/0074* (2013.01); *B22F 9/24* (2013.01); *C09D 11/037* (2013.01); *C22B 11/04* (2013.01); *B22F 2009/245* (2013.01); *B22F 2301/255* (2013.01); *B22F 2304/05* (2013.01)

(58) Field of Classification Search
CPC ..... C09D 11/52; C09D 11/037; B22F 1/0018; B22F 1/0022; B22F 1/0074; B22F 9/24; B22F 2009/245; B22F 2301/255; B22F 2304/05; C22B 11/04
USPC ......................................................... 252/500
See application file for complete search history.

(56) References Cited

U.S. PATENT DOCUMENTS

2014/0299821 A1* 10/2014 Rudhardt .............. B22F 1/0022
252/514

FOREIGN PATENT DOCUMENTS

| CN | 101497135 A | 8/2009 |
| CN | 101928488 A | 12/2010 |
| (Continued) | | |

*Primary Examiner* — Mark Kopec
*Assistant Examiner* — Danny N Kang
(74) *Attorney, Agent, or Firm* — Volpe and Koenig, P.C.

(57) ABSTRACT

A method for preparing nano-silver powder dispersible in environment friendly weak solvents, and an electrically conductive ink comprising the nano-silver powder are disclosed. The disclosure describes a disperser dissoluble in water and weak solvents and an alcohol amine as reducing agent to prepare mono-dispersed nano-silver, and employs ultrafiltration for purification and spray drying process to obtain a nano-silver powder dispersible in weak solvents, and thereby obtain an eco-solvent nano-silver electrically conductive ink. The electrically conductive ink in accordance with the disclosure has advantages of high safety, low volatility, low toxicity, high flash point, resistant to ultra-violet radiation and moisture etc., and can be used with uncoated bearing substrates, and is suitable for use in outdoor environments.

8 Claims, 1 Drawing Sheet

(51) Int. Cl.
*C22B 11/00* (2006.01)
*B22F 1/00* (2006.01)
*C22B 3/00* (2006.01)
*C09D 11/037* (2014.01)

(56) References Cited

FOREIGN PATENT DOCUMENTS

| | | | |
|---|---|---|---|
| CN | 102120265 A | | 7/2011 |
| CN | 102372947 A | | 3/2012 |
| CN | 102658744 A | | 9/2012 |
| CN | 103258584 A | * | 8/2013 |
| CN | 103396700 A | | 11/2013 |
| JP | 2002241463 A | | 8/2002 |

* cited by examiner

METHOD FOR PREPARING NANO-SILVER POWDER AND APPLICATION IN PREPARATION OF ELECTRICALLY CONDUCTIVE INK OF THE NANO-SILVER POWDER AND ELECTRICALLY CONDUCTIVE INK

CROSS REFERENCE TO RELATED APPLICATIONS

This application claims priority to Chinese Patent Application No. 201410723078.6, which was filed Dec. 2, 2014, and is incorporated herein by reference as if fully set forth.

FIELD OF THE INVENTION

The present invention pertains to the technical field of electrically conductive ink preparation, in particular to a method for preparing nano-silver powder and an application of the nano-silver powder in preparation of electrically conductive ink of the same, and an electrically conductive ink.

BACKGROUND OF THE INVENTION

In recent years, the printing electronics technology has been developed quickly, and has covered the domains including printed circuits, organic electronic elements/components, transistors, display panels, sensors, photoelectric tubes, batteries, illuminators, conductors, and semiconductors, etc. A critical material in the printing electronics technology is electronic ink, in which electrically conductive ink is the most common and fundamental electronic ink, and the quality of electrically conductive ink has a decisive influence on the performance of printed electronic components. As an important electrically conductive packing material at present, nano-silver has become one of the hot spots in the research and development in the electrically conductive ink field globally.

At present, most nano-silver electrically conductive ink products that have been developed and are available in the market are water-based electrically conductive ink products and solvent-type electrically conductive ink products. Since the principal ingredient in water-based electrically conductive ink is water, the volatilization rate of the water-based electrically conductive ink is very low, and circuits printed with water-based electrically conductive ink are not easy to dry. Consequently, the bearing medium must have special coating; electronic circuits prepared with water-based electrically conductive ink have poor weather resistance, and it is difficult to maintain long-term performance stability of such electronic circuits in humid environments. Solvent-type nano-silver electrically conductive ink products mainly employ long-chain alkyl acids (e.g., dodecyl acid, hexadecyl acid), long-chain alkylamines (e.g., laurylamine, hexadecylamine), and long-chain alkyl benzene sulfonic acids (e.g., dodecylbenzene sulfonic acid) as the coating agent. Such electrically conductive ink products prepared with nano-silver as the electrically conductive packing material mainly employ benzenes (e.g., methyl benzene, dimethyl benzene) and alkanes (n-hexane, cyclohexane, and tetradecane, etc.) as the solvent. However, the most severe drawback among such electrically conductive ink products is severe environmental pollution, because the volatile organic content in the ink is very high. In view of environmental protection, the application of such electrically conductive ink products will be restricted gradually; in addition, since an Xaar or Spectra inkjet head is used in the printing process, most circuits prepared with such solvent-type electrically conductive ink products have low accuracy.

Therefore, it is of great research significance and potential market value to develop an environment-friendly, highly accurate, and weather-resistant nano-silver dispersible in weak solvent (eco-solvent), and an electrically conductive ink prepared from the same.

SUMMARY OF THE INVENTION

In view of the drawbacks in existing electrically conductive ink products in the prior art, that is, poor weather resistance of water-based electrically conductive ink products, and severe environmental pollution of solvent-type electrically conductive ink products, the present invention provides a nano-silver powder dispersible in environment friendly weak solvents and an electrically conductive ink prepared with the same.

The present invention employs a disperser dissoluble in both water and weak solvents (eco-solvent) and an alcohol amine as reducing agent to prepare mono-dispersed nano-silver, and employs ultrafiltration for purification and spray drying process to obtain a nano-silver powder dispersible in weak solvents, and thereby obtain an eco-solvent nano-silver electrically conductive ink.

In accordance with the first aspect of the invention, the present invention intends to provide a method for preparing a nano-silver powder, comprising:

(1) dispersing 1 g to 15 g silver salt precursor in 10 mL to 120 mL solvent, to obtain a silver salt dispersion;
(2) dissolving 1 g to 60 g disperser in 10 mL to 200 mL solvent, to obtain a disperser solution;
(3) dissolving 0.5 g to 20 g reducing agent in 10 mL to 200 mL solvent, to obtain a reducing agent solution;
(4) homogeneously mixing the disperser solution obtained in the step (2) with the silver salt dispersion obtained in the step (1) with stirring at a constant speed in a range of 100 rpm to 500 rpm, to obtain a mixed solution;
(5) adding the reducing agent solution obtained in the step (3) in droplets at a constant rate into the mixed solution obtained in the step (4) with stirring and then reacting for a period of 120 min to 600 min at a temperature of 20° C. to 90° C., to obtain a nano-silver particles dispersion;
(6) treating the nano-silver particles dispersion obtained in the step (5) by cycling separation through ultrafiltration membranes, and then drying by centrifugal spray drying, to obtain a nano-silver powder.

The silver salt precursor may be one or more selected from the group consisting of silver nitrate, silver acetate, silver sulfate, silver oxalate, silver laurate, and silver malate.

The disperser may be disperser for water and weak solvents. The term of "disperser for water and weak solvent" refers to a disperser that is dissoluble in both water and weak solvents. The disperser is preferably an acrylic-modified polyurethane-based disperser.

Specifically, the disperser may be one or more selected from the group consisting of Disperser HLD-8 from Silcona (German), Disperser W-S90 from PARTNER, Disperser EL-W604 from EONLEO, Disperser 904 from DEUCHEM, Dispersers B-180, B-4500, B-4509, and B-22255 from BYK, and Dispersers 12B, 10S, and 12W-A from Sanzheng (Shanghai, China).

The reducing agent is alcohol amine-based reducing agent.

Specifically, the reducing agent may be one or more selected from the group consisting of iso-propanolamine, n-butanolamine, ethanolamine, diethanolamine, triethanolamine, methanolamine, n-propanolamine, diisopropanolamine, diphenylpropanolamine, diglycolamine, iso-butanolamine, and triisobutanolamine.

In the steps (1), (2), and (3), the solvent may be one or more selected from the group consisting of deionized water, ethanol, isopropanol, propanol, ethylene glycol, and glycerol, and preferably is deionized water. The solvent respectively used in the steps (1), (2), and (3) may be same or different, and preferably is same.

The ultrafiltration membrane may be ceramic filter membrane or cellulosic filter membrane. The ultrafiltration membrane may have a pore size in a range of 10 kDa to 500 kDa.

The surface of the nano-silver powder prepared by the method in accordance with the first aspect of the invention is coated with the disperser. The disperser may be in a content of 0.1% to 10% by weight based on the nano-silver powder. Preferably, the disperser is in a content of 1% to 8% by weight based on the nano-silver powder. More preferably, the disperser is in a content of 2% to 5% by weight based on the nano-silver powder.

The nano-silver powder prepared by the method in accordance with the first aspect of the invention may have a particle size in a range of 5 nm to 100 nm, preferably in a range of 20 nm to 90 nm, more preferably in a range of 30 nm to 50 nm. The particle size is measured by scanning electronic microscope, and is an average value of the particle sizes (i.e., the largest length in radical direction) for the particles appeared in the ocular at a magnification of 30000.

The nano-silver powder prepared by the method in accordance with the first aspect of the invention may be dispersible in weak solvents. The weak solvent may be one or more selected from the group consisting of ethylene glycol monobutyl ether acetate, propylene glycol monomethyl ether acetate, di-propylene glycol monomethyl ether acetate, di-propylene glycol monoethyl ether acetate, di-propylene glycol monobutyl ether acetate, propylene glycol monoethyl ether acetate, di-ethylene glycol monomethyl ether acetate, di-ethylene glycol monoethyl ether acetate, di-ethylene glycol monobutyl ether acetate, ethylene glycol monophenyl ether acetate, propylene glycol monophenyl ether acetate, di-glycol monobutyl ether acetate, di-propylene glycol monomethyl ether, tripropylene glycol monomethyl ether, terpineol, tri-ethylene glycol monomethyl ether, tri-ethylene glycol monobutyl ether, di-ethylene glycol monomethyl ether, and di-ethylene glycol monobutyl ether.

In accordance with the second aspect of the invention, the present invention intends to provide an application of the nano-silver powder prepared by the method in accordance with the first aspect of the invention in preparing electrically conductive ink.

The electrically conductive ink may comprise the nano-silver powder, optional at least one adhesive, at least one weak solvent and optional at least one additive. Based on the electrically conductive ink, the nano-silver powder may be in a content of 10% to 80% by weight, the adhesive may be in a content of 0% to 20% by weight, the weak solvent may be in a content of 15% to 90% by weight, and the balance of additive.

The adhesive may be one or more selected from the group consisting of polyurethane resin, polyester resin, vinyl chloride-vinyl acetate resin, phenolic resin, polyvinyl alcohol, polyacrylate, and epoxy resin.

The weak solvent may be one or more selected from the group consisting of ethylene glycol monobutyl ether acetate, propylene glycol monomethyl ether acetate, di-propylene glycol monomethyl ether acetate, di-propylene glycol monoethyl ether acetate, di-propylene glycol monobutyl ether acetate, propylene glycol monoethyl ether acetate, di-ethylene glycol monomethyl ether acetate, di-ethylene glycol monoethyl ether acetate, di-ethylene glycol monobutyl ether acetate, ethylene glycol monophenyl ether acetate, propylene glycol monophenyl ether acetate, di-glycol monobutyl ether acetate, di-propylene glycol monomethyl ether, tripropylene glycol monomethyl ether, terpineol, tri-ethylene glycol monomethyl ether, tri-ethylene glycol monobutyl ether, di-ethylene glycol monomethyl ether, and di-ethylene glycol monobutyl ether.

The additive is additive for ink, and may be one or more selected from the group consisting of humectant, anti-foaming agent, pH conditioning agent, thickening agent, adhesion promoting agent, thixotropic agent, flatting agent, and curing agent.

The humectant may be one or more selected from the group consisting of Igebal BC-10 from Rhodia, T1004 from Huntsman, Morwet EFW from AkzoNobel. The humectant may be in a content of 0 to 2% by weight based on the electrically conductive ink.

The anti-foaming agent may be one or more selected from the group consisting of BYK-055 from BYK, BYK-057 from BYK, BYK-070 from BYK and BYK-141 from BYK. The anti-foaming agent may be in a content of 0 to 1% by weight based on the electrically conductive ink.

The pH conditioning agent may be one or more selected from the group consisting of 1-dimethylamino-2-propanol, N,N-dimethyl ethanolamine, and 2-amino-2-methyl-1-propanol. The pH conditioning agent may be in a content of 0 to 2° % by weight based on the electrically conductive ink.

The thickening agent may be one or more selected from the group consisting of hydroxypropyl cellulose, Acacia senegal, polyvinyl alcohol, gelatin and sodium alginate. The thickening agent may be in a content of 0 to 2% by weight based on the electrically conductive ink.

The adhesion promoting agent may be one or more selected from the group consisting of BYK-4500 from BYK, BYK-4512 from BYK, Adherant 1031 from DEUCHEM, Adherant 1051 from DEUCHEM. The adhesion promoting agent may be in a content of 0 to 2% by weight based on the electrically conductive ink.

The thixotropic agent may be one or more selected from the group consisting of BYK-R605 from BYK, MOK7010 from Merck, CX0606 from ChangXin (China), and polyamide wax. The thixotropic agent may be in a content of 0 to 2% by weight based on the electrically conductive ink.

The flatting agent may be one or more selected from the group consisting of BNK-LK-400 from Milliken, BNK-LK600 from Milliken, BYK-355 from BYK, BYK-333 from BYK and BYK-315 from BYK. The flatting agent may be in a content of 0 to 1% by weight based on the electrically conductive ink.

The curing agent is dependent on the adhesive, may be one or more selected from the group consisting of diethylenetriamine, 1,6-hexanediamine, trimethylhexamethylenediamine, Bayer L75 from Bayer, N75 from Bayer, and N3390 from Bayer. The content of the curing agent may be determined by the type and content of the adhesive, and there is no other restriction.

The viscosity of the electrically conductive ink may be adjusted according to the type of the printing process (mainly including digital ink-jet printing, screen printing, flexographic printing, intaglio printing, intaglio-offset printing, imprinting, EHD jetting, microcontact printing, etc.).

In accordance with the third aspect of the invention, the present invention intends to provide an electrically conductive ink, comprising the nano-silver powder prepared by the method in accordance with the second aspect of the present application, optional at least one adhesive, at least one weak solvent and optional at least one additive. Based on the electrically conductive ink, the nano-silver powder may be in a content of 10% to 80% by weight, the adhesive may be in a content of 0% to 20% by weight, the weak solvent may be in a content of 15% to 90% by weight, and the balance of additives.

The adhesive may be one or more selected from the group consisting of polyurethane resin, polyester resin, vinyl chloride-vinyl acetate resin, phenolic resin, polyvinyl alcohol, polyacrylate, and epoxy resin.

The weak solvent may be one or more selected from the group consisting of ethylene glycol monobutyl ether acetate, propylene glycol monomethyl ether acetate, di-propylene glycol monomethyl ether acetate, di-propylene glycol monoethyl ether acetate, di-propylene glycol monobutyl ether acetate, propylene glycol monoethyl ether acetate, di-ethylene glycol monomethyl ether acetate, di-ethylene glycol monoethyl ether acetate, di-ethylene glycol monobutyl ether acetate, ethylene glycol monophenyl ether acetate, propylene glycol monophenyl ether acetate, di-glycol monobutyl ether acetate, di-propylene glycol monomethyl ether, tri-propylene glycol monomethyl ether, terpineol, tri-ethylene glycol monomethyl ether, tri-ethylene glycol monobutyl ether, di-ethylene glycol monomethyl ether, and di-ethylene glycol monobutyl ether.

The additive are additive for ink, and may be one or more selected from the group consisting of humectant, anti-foaming agent, pH conditioning agent, thickening agent, adhesion promoting agent, thixotropic agent, flatting agent, and curing agent.

The humectant may be one or more selected from the group consisting of Igebal BC-10 from Rhodia, T1004 from Huntsman, Morwet EFW from AkzoNobel. The humectant may be in a content of 0 to 2% by weight based on the electrically conductive ink.

The anti-foaming agent may be one or more selected from the group consisting of BYK-055 from BYK, BYK-057 from BYK, BYK-070 from BYK and BYK-141 from BYK. The anti-foaming agent may be in a content of 0 to 1% by weight based on the electrically conductive ink.

The pH conditioning agent may be one or more selected from the group consisting of 1-dimethylamino-2-propanol, N,N-dimethyl ethanolamine, and 2-amino-2-methyl-1-propanol. The pH conditioning agent may be in a content of 0 to 2% by weight based on the electrically conductive ink.

The thickening agent may be one or more selected from the group consisting of hydroxypropyl cellulose, Acacia senegal, polyvinyl alcohol, gelatin and sodium alginate. The thickening agent may be in a content of 0 to 2% by weight based on the electrically conductive ink.

The adhesion promoting agent may be one or more selected from the group consisting of BYK-4500 from BYK, Adherant 1031 from DEUCHEM, Adherant 1051 from DEUCHEM. The adhesion promoting agent may be in a content of 0 to 2% by weight based on the electrically conductive ink.

The thixotropic agent may be one or more selected from the group consisting of BYK-R605 from BYK, MOK7010 from Merck, CX0606 from ChangXin (China), and polyamide wax. The thixotropic agent may be in a content of 0 to 2% by weight based on the electrically conductive ink.

The flatting agent may be one or more selected from the group consisting of BNK-LK-400 from Milliken, BNK-LK600 from Milliken, BYK-355 from BYK, BYK-333 from BYK and BYK-315 from BYK. The flatting agent may be in a content of 0 to 1% by weight based on the electrically conductive ink.

The curing agent is dependent on the adhesive, may be one or more selected from the group consisting of diethylenetriamine, 1,6-hexanediamine, trimethylhexamethylenediamine, Bayer L75 from Bayer, N75 from Bayer, and N3390 from Bayer. The content of the curing agent may be determined by the type and content of the adhesive, and there is no other restriction.

The viscosity of the electrically conductive ink may be adjusted according to the type of the printing process (mainly including digital ink-jet printing, screen printing, flexographic printing, intaglio printing, intaglio-offset printing, imprinting, EHD jetting, microcontact printing, etc.).

The disperser employed in the present invention upon preparing the nano-silver powder is dissoluble in both water and weak solvents, the nano-silver powder prepared with the disperser is dissoluble in weak solvents, and thereby an eco-solvent type electrically conductive ink can be obtained. The particle size of the nano-silver particles in the nano-silver powder prepared by the present invention may be in a range of 5 nm to 100 nm, preferably in a range of 20 nm to 90 nm, more preferably in a range of 30 nm to 50 nm. The surfaces of the nano-silver particles are coated with the disperser. The content of nano-silver particles may be higher than 95% by weight, and the conversion ratio of the silver salt precursor may be in a range of 70% to 98%. The nano-silver electrically conductive ink in accordance with the present invention is environment friendly with high accuracy and high weather resistance, and is dispersible in weak solvents with a surface tension in a range of 10 dynes/cm to 90 dynes/cm, preferably in a range of 20 dynes/cm to 50 dynes/cm, more preferably in a range of 25 dynes/cm to 35 dynes/cm. The film by printing the electrically conductive ink on the surface of PET-film shows a square resistance (measured by four-point probe method) in a range of 10-10000 mΩ/□/mil, preferably in a range of 10-100 mΩ/□/mil, more preferably in a range of 10-60 mΩ/□/mil.

The electrically conductive ink in accordance with the present application has advantages of high safety, low volatility, low toxicity, high flash point, resistant to ultraviolet radiation and resistant to moisture etc., and can be used with uncoated bearing substrates, and is suitable for use in outdoor environments.

DETAILED DESCRIPTION OF THE EMBODIMENTS

Example 1

Figure 1:
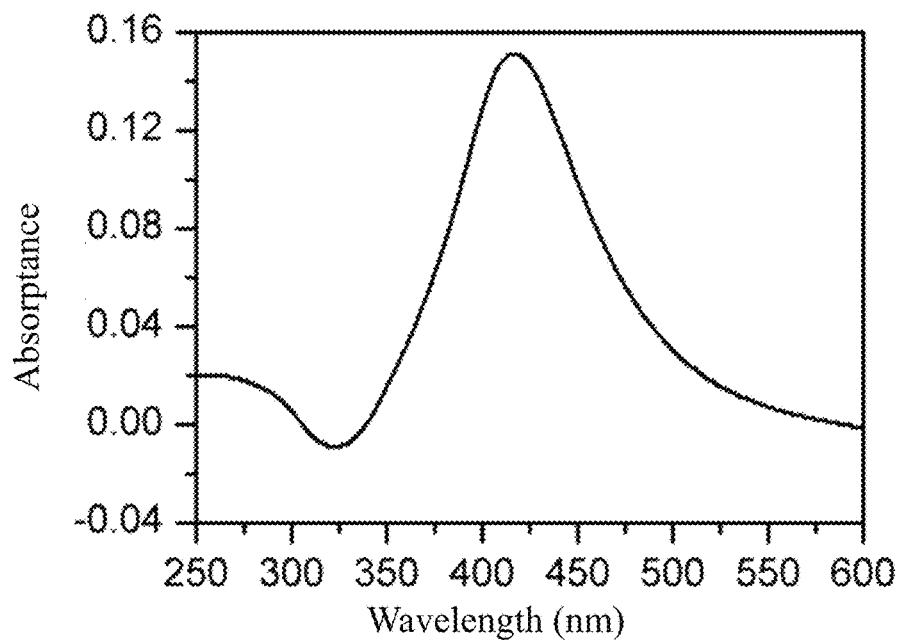
FIG. 1 is an ultraviolet-visible absorption spectrogram of the dispersed solution of nano-silver particles prepared by Example 1 of the present invention obtained by ultraviolet-visible spectrophotometer Shimadzu UV-2600 (Japan).
Figure 2:
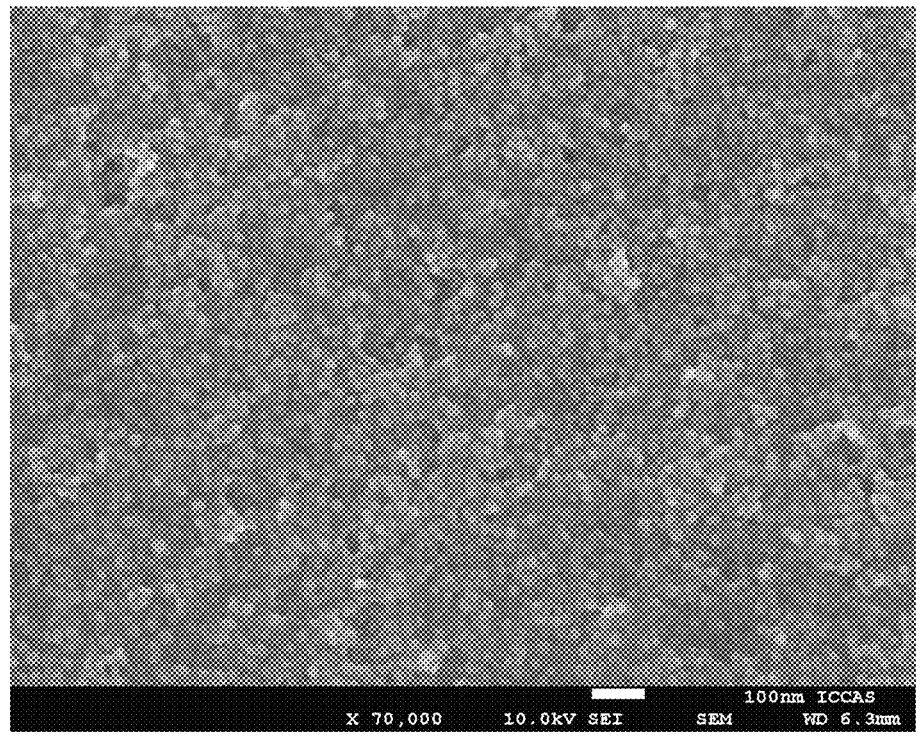
FIG. 2 is a scanning electronic microscope (SEM) image of the nano-silver powder prepared by Example 1 of the present invention obtained by JSM-7500F (Japan).

10 g silver nitrate is dissolved in 100 mL deionized water to obtain a silver nitrate solution. 25 g disperser (Disperser W-S90 from PARTNER) is dissolved in 150 mL deionized water with stirring, and the obtained solution is added into the silver nitrate solution with stirring at a constant speed of 100 rpm, to obtain a mixed solution. 5 g n-butanolamine as reducing agent is dissolved in 100 mL deionized water with stirring, to obtain an n-butanolamine solution. The n-butanolamine solution is added into the mixed solution in droplets at a constant rate of 50 mL/min with stirring at room temperature (25° C.) to obtain a reaction mixture. Then, the reaction mixture is reacted at room temperature for 480 min, so as to obtain a dispersed solution of nano-silver particles.

The dispersed solution of nano-silver particles is subjected to cycling separation through ultrafiltration membranes by using a ceramic filter membrane with a pore size of 30 kDa, to retain the nano-silver particles, and the excessive disperser and other reaction by-products is disposed as waste filtrate. The residual dispersed solution of nano-silver particles is dried by centrifugal spray drying, to obtain nano-silver powder. Based on the nano-silver powder, the content of nano-silver is 98% by weight, and the balance is the disperser coated on the surfaces of the nano-silver particles. The particle size of the nano-silver particles in the nano-silver powder is 30.0±5.0 nm, and the conversion ratio of silver nitrate is 95%.

35% by weight nano-silver powder prepared, 3% by weight polyacrylate adhesive (ZB-25 from Fengyuan Chemical Co. Ltd. (Zibo, China)), 55% by weight propylene glycol monomethyl ether acetate and 6% by weight diethylene glycol monobutyl ether acetate as weak solvent, and 1% by weight anti-foaming agent BYK-141 from BYK are mixed homogeneously, to obtain nano-silver electrically conductive ink that can be used for spray printing.

The obtained nano-silver electrically conductive ink has a surface tension of 29 dynes/cm and a square resistance (measured by four-point probe method) of 37 mΩ/□/mil by coating on PET-film substrate, wherein the surface tension is obtained on fully automatic surface tension meter (K100SF from KRUSS), and the square resistance is obtained on semiconductor parameter measuring instrument (Keithley 4200 from Keithley Instruments, Inc.).

Comparative Example 1

The nano-silver particles are prepared by the method same to Example, but the difference is in that the disperser is lack, and the procedure is shown as below.

10 g silver nitrate is dissolved in 100 mL deionized water to obtain a silver nitrate solution. 5 g n-butanolamine as reducing agent is dissolved in 100 mL deionized water with stirring, to obtain an n-butanolamine solution. The n-butanolamine solution is added into the silver nitrate solution in droplets at a constant rate with stirring at room temperature (25° C.) to obtain a reaction mixture. Then, the reaction mixture is reacted at room temperature for 480 min. But no nano-silver powder is obtained.

Example 2

12 g silver acetate is dispersed in 120 mL deionized water to obtain a silver acetate dispersion. 40 g disperser (Disperser HLD-8 from Silcona (Germany)) is dissolved in 200 mL deionized water with stirring, and the obtained solution is added into the silver acetate dispersion with stirring at a constant speed of 500 rpm, to obtain a mixed dispersion. 7 g iso-propanolamine as reducing agent is dissolved in 120 mL deionized water with stirring, to obtain an iso-propanolamine solution. The iso-propanolamine solution is added into the mixed dispersion in droplets at a constant rate of 50 mL/min with stirring at a temperature of 40° C. to obtain a reaction mixture. Then, the reaction mixture is reacted at 40° C. for 360 min, so as to obtain a dispersed solution of nano-silver particles.

The dispersed solution of nano-silver particles is subjected to cycling separation through ultrafiltration membranes by using a ceramic filter membrane with a pore size of 80 kDa, to retain the nano-silver particles, and the excessive disperser and other reaction by-products is disposed as waste filtrate. The residual dispersed solution of nano-silver particles is dried by centrifugal spray drying, to obtain nano-silver powder. Based on the nano-silver powder, the content of nano-silver is 96% by weight, and the balance is the disperser coated on the surfaces of the nano-silver particles. The particle size of the nano-silver particles in the nano-silver powder is 50.0±5.0 nm, and the conversion ratio of silver acetate is 88%.

55% by weight nano-silver powder prepared, 2.5% by weight vinyl chloride-vinyl acetate resin (CP-430 from Hanwha, Korea) and 20% by weight polyester resin (DB3500 from Canada Nadar Chemical (Heshan) Co. Ltd.), 35% by weight diethylene glycol monobutyl ether acetate and 4% by weight di-propylene glycol monobutyl ether acetate as weak solvent, and 1.5% by weight adhesion promoting agent BYK-4512 from BYK are mixed homogeneously, to obtain nano-silver electrically conductive ink that can be used for intaglio printing.

The obtained nano-silver electrically conductive ink has a surface tension of 26 dynes/cm and a square resistance (measured by four-point probe method) of 45 mΩ/□/mil by coating on PET-film substrate, wherein the surface tension is obtained on fully automatic surface tension meter (K100SF from KRUSS), and the square resistance is obtained on semiconductor parameter measuring instrument (Keithley 4200 from Keithley Instruments, Inc.).

Example 3

11 g silver laurate is dispersed in 80 mL deionized water to obtain a silver laurate dispersion. 20 g disperser (Disperser EL-W604 from EONLEO) is dissolved in 120 mL deionized water with stirring, and the obtained solution is added into the silver laurate dispersion with stirring at a constant speed of 200 rpm, to obtain a mixed dispersion. 9 g ethanolamine as reducing agent is dissolved in 80 mL deionized water with stirring, to obtain an ethanolamine solution. The ethanolamine solution is added into the mixed dispersion in droplets at a constant rate of 50 mL/min with stirring at a temperature of 50° C. to obtain a reaction mixture. Then, the reaction mixture is reacted at 50° C. for 300 min, so as to obtain a dispersed solution of nano-silver particles.

The dispersed solution of nano-silver particles is subjected to cycling separation through ultrafiltration membranes by using a ceramic filter membrane with a pore size of 10 kDa, to retain the nano-silver particles, and the excessive disperser and other reaction by-products is disposed as waste filtrate. The residual dispersed solution of nano-silver particles is dried by centrifugal spray drying, to obtain nano-silver powder. Based on the nano-silver powder, the content of nano-silver is 97% by weight, and the balance is the disperser coated on the surfaces of the nano-silver particles. The particle size of the nano-silver particles in the nano-silver powder is 20.0±5.0 nm, and the conversion ratio of silver laurate is 83%.

A nano-silver electrically conductive ink is obtained by using the nano-silver particles prepared in Example 3 through the method same to Example 2. The obtained nano-silver electrically conductive ink has a surface tension of 32 dynes/cm and a square resistance (measured by four-point probe method) of 40 mΩ/□/mil by coating on PET-film substrate, wherein the surface tension is obtained on fully automatic surface tension meter (K100SF from KRUSS), and the square resistance is obtained on semiconductor parameter measuring instrument (Keithley 4200 from Keithley Instruments, Inc.).

Example 4

15 g silver malate is dispersed in 120 mL deionized water to obtain a silver malate dispersion. 40 g disperser (Disperser 904 from DEUCHEM) is dissolved in 200 mL deionized water with stirring, and the obtained solution is added into the silver malate dispersion with stirring at a constant speed of 300 rpm, to obtain a mixed dispersion. 12 g diethanolamine as reducing agent is dissolved in 70 mL deionized water with stirring, to obtain a diethanolamine solution. The diethanolamine solution is added into the mixed dispersion in droplets at a constant rate of 50 mL/min with stirring at a temperature of 70° C. to obtain a reaction mixture. Then, the reaction mixture is reacted at 70° C. for 200 min, so as to obtain a dispersed solution of nano-silver particles.

The dispersed solution of nano-silver particles is subjected to cycling separation through ultrafiltration membranes by using a ceramic filter membrane with a pore size of 100 kDa, to retain the nano-silver particles, and the excessive disperser and other reaction by-products is disposed as waste filtrate. The residual dispersed solution of nano-silver particles is dried by centrifugal spray drying, to obtain nano-silver powder. Based on the nano-silver powder, the content of nano-silver is 95% by weight, and the balance is the disperser coated on the surfaces of the nano-silver particles. The particle size of the nano-silver particles in the nano-silver powder is 60.0±5.0 nm, and the conversion ratio of silver malate is 72%.

75% by weight nano-silver powder prepared, 6% by weight epoxy resin as adhesive (E-51 from Sanmu (Jiangsu, China)), 12% by weight propylene glycol monophenyl ether acetate and 4% by weight di-ethylene glycol monobutyl ether acetate as weak solvent, 2% by weight thixotropic agent (MOK7010 from Merck) and 1% by weight flatting agent (BYK-333 from BYK) are mixed homogeneously, to obtain nano-silver electrically conductive ink that can be used for intaglio printing.

The obtained nano-silver electrically conductive ink has a surface tension of 30 dynes/cm and a square resistance (measured by four-point probe method) of 55 mΩ/□/mil by coating on PET-film substrate, wherein the surface tension is obtained on fully automatic surface tension meter (K100SF from KRUSS), and the square resistance is obtained on semiconductor parameter measuring instrument (Keithley 4200 from Keithley Instruments, Inc.).

Example 5

12 g silver sulfate is dispersed in 100 mL deionized water to obtain a silver sulfate dispersion. 30 g disperser (Dispersers B-180 from BYK) is dissolved in 180 mL deionized water with stirring, and the obtained solution is added into the silver sulfate dispersion with stirring at a constant speed of 400 rpm, to obtain a mixed dispersion. 18 g methanolamine as reducing agent is dissolved in 110 mL deionized water with stirring, to obtain a methanolamine solution. The methanolamine solution is added into the mixed dispersion in droplets at a constant rate of 50 mL/min with stirring at a temperature of 50° C. to obtain a reaction mixture. Then, the reaction mixture is reacted at 50° C. for 450 min, so as to obtain a dispersed solution of nano-silver particles.

The dispersed solution of nano-silver particles is subjected to cycling separation through ultrafiltration membranes by using a ceramic filter membrane with a pore size of 200 kDa, to retain the nano-silver particles, and the excessive disperser and other reaction by-products is disposed as waste filtrate. The residual dispersed solution of nano-silver particles is dried by centrifugal spray drying, to obtain nano-silver powder. Based on the nano-silver powder, the content of nano-silver is 96% by weight, and the balance is the disperser coated on the surfaces of the nano-silver particles. The particle size of the nano-silver particles in the nano-silver powder is 75.0±5.0 nm, and the conversion ratio of silver sulfate is 84%.

A nano-silver electrically conductive ink is obtained by using the nano-silver particles prepared in Example 5 through the method same to Example 4. The obtained nano-silver electrically conductive ink has a surface tension of 28 dynes/cm and a square resistance (measured by four-point probe method) of 48 mΩ/□/mil by coating on PET-film substrate, wherein the surface tension is obtained on fully automatic surface tension meter (K100SF from KRUSS), and the square resistance is obtained on semiconductor parameter measuring instrument (Keithley 4200 from Keithley Instruments, Inc.).

Example 6

14 g silver oxalate is dispersed in 100 mL deionized water to obtain a silver oxalate dispersion. 60 g disperser (Dispersers 12B from Sanzheng (Shanghai, China)) is dissolved in 200 mL deionized water with stirring, and the obtained solution is added into the silver oxalate dispersion with stirring at a constant speed of 350 rpm, to obtain a mixed dispersion. 4 g diphenylpropanolamine as reducing agent is dissolved in 80 mL deionized water with stirring, to obtain a diphenylpropanolamine solution. The diphenylpropanolamine solution is added into the mixed dispersion in droplets at a constant rate of 50 mL/min with stirring at a temperature of 80° C. to obtain a reaction mixture. Then, the reaction mixture is reacted at 80° C. for 500 min, so as to obtain a dispersed solution of nano-silver particles.

The dispersed solution of nano-silver particles is subjected to cycling separation through ultrafiltration membranes by using a ceramic filter membrane with a pore size of 300 kDa, to retain the nano-silver particles, and the excessive disperser and other reaction by-products is disposed as waste filtrate. The residual dispersed solution of nano-silver particles is dried by centrifugal spray drying, to obtain nano-silver powder. Based on the nano-silver powder, the content of nano-silver is 95% by weight, and the balance is the disperser coated on the surfaces of the nano-silver particles. The particle size of the nano-silver particles in the nano-silver powder is 90.0±10.0 nm, and the conversion ratio of silver oxalate is 90%.

40% by weight nano-silver powder prepared, 4% by weight polyurethane resin as adhesive (GM 8208 from Comens Material (Beijing, China)), 40% by weight propylene glycol monomethyl ether acetate and 16% by weight di-ethylene glycol monomethyl ether acetate as weak solvent are mixed homogeneously, to obtain nano-silver electrically conductive ink that can be used for imprinting.

The obtained nano-silver electrically conductive ink has a surface tension of 26 dynes/cm and a square resistance (measured by four-point probe method) of 50 m$\Omega$/□/mil by coating on PET-film substrate, wherein the surface tension is obtained on fully automatic surface tension meter (K100SF from KRUSS), and the square resistance is obtained on semiconductor parameter measuring instrument (Keithley 4200 from Keithley Instruments, Inc.).

What is claimed is:

1. An electrically conductive ink consisting of a nano-silver powder, optionally at least one adhesive, at least one weak solvent and optionally at least one additive, wherein the nano-silver powder is in a content of 10% to 80% by weight, the at least one additive is in a content of 0% to 20% by weight, the at least one weak solvent is in a content of 15% to 90% by weight, and the at least one additive is in a content of 0% to 75%, and the percent by weight for the nano-silver powder, the at least one adhesive, the at least one weak solvent, and the at least one additive, are based on the weight of the electrically conductive ink; the at least one weak solvent is one or more selected from the group consisting of ethylene glycol monobutyl ether acetate, propylene glycol monomethyl ether acetate, di-propylene glycol monomethyl ether acetate, di-propylene glycol monoethyl ether acetate, di-propylene glycol monobutyl ether acetate, propylene glycol monoethyl ether acetate, di-ethylene glycol monomethyl ether acetate, di-ethylene glycol monoethyl ether acetate, di-ethylene glycol monobutyl ether acetate, ethylene glycol monophenyl ether acetate, propylene glycol monophenyl ether acetate, di-glycol monobutyl ether acetate, di-propylene glycol monomethyl ether, tri-propylene glycol monomethyl ether, terpineol, tri-ethylene glycol monomethyl ether, tri-ethylene glycol monobutyl ether, di-ethylene glycol monomethyl ether, and di-ethylene glycol monobutyl ether; and the nano-silver powder is dissoluble in both water and weak solvents; the nano-silver particles in the nano-silver powder have a particle size of 20 nm to 90 nm, the surfaces of the nano-silver particles are coated with disperser, and wherein the disperser is an acrylic-modified polyurethane-based disperser.

2. The electrically conductive ink according to claim 1, wherein the at least one adhesive is one or more selected from the group consisting of polyurethane resin, polyester resin, vinyl chloride-vinyl acetate resin, phenolic resin, polyvinyl alcohol, polyacrylate, and epoxy resin.

3. The electrically conductive ink according to claim 1, wherein the additive is one or more selected from the group consisting of humectant, anti-foaming agent, pH conditioning agent, thickening agent, adhesion promotion agent, thixotropic agent, flatting agent, and curing agent.

4. The electrically conductive ink according to claim 1, wherein the disperser is a disperser for water and weak solvents.

5. An electrically conductive ink consisting of a nano-silver powder, optionally at least one adhesive, at least one weak solvent and optionally at least one additive, wherein the nano-silver powder is in a content of 10% to 80% by weight, the at least one additive is in a content of 0% to 20% by weight, the at least one weak solvent is in a content of 15% to 90% by weight, and the at least one additive is in a content of 0% to 75%, and the percent by weight for the nano-silver powder, the at least one adhesive, the at least one weak solvent, and the at least one additive, are based on the weight of the electrically conductive ink; the at least one weak solvent is one or more selected from the group consisting of ethylene glycol monobutyl ether acetate, propylene glycol monomethyl ether acetate, di-propylene glycol monomethyl ether acetate, di-propylene glycol monoethyl ether acetate, di-propylene glycol monobutyl ether acetate, propylene glycol monoethyl ether acetate, di-ethylene glycol monomethyl ether acetate, di-ethylene glycol monoethyl ether acetate, di-ethylene glycol monobutyl ether acetate, ethylene glycol monophenyl ether acetate, propylene glycol monophenyl ether acetate, di-glycol monobutyl ether acetate, di-propylene glycol monomethyl ether, tri-propylene glycol monomethyl ether, terpineol, tri-ethylene glycol monomethyl ether, tri-ethylene glycol monobutyl ether, di-ethylene glycol monomethyl ether, and di-ethylene glycol monobutyl ether; and the nano-silver powder is dissoluble in both water and weak solvents; the nano-silver particles in the nano-silver powder have a particle size of 5 nm to 100 nm, the surfaces of the nano-silver particles are coated with disperser, and wherein the disperser is an acrylic-modified polyurethane-based disperser.

6. The electrically conductive ink according to claim 5, wherein the at least one adhesive is one or more selected from the group consisting of polyurethane resin, polyester resin, vinyl chloride-vinyl acetate resin, phenolic resin, polyvinyl alcohol, polyacrylate, and epoxy resin.

7. The electrically conductive ink according to claim 5, wherein the additive is one or more selected from the group consisting of humectant, anti-foaming agent, pH conditioning agent, thickening agent, adhesion promotion agent, thixotropic agent, flatting agent, and curing agent.

8. The electrically conductive ink according to claim 5, wherein the disperser is a disperser for water and weak solvents.

* * * * *